United States Patent [19]
Hafner et al.

[11] 4,264,459
[45] Apr. 28, 1981

[54] STABILIZED ORGANOPOLYSILOXANE OILS

[75] Inventors: Walter Hafner, Furth; Erich Markl; Dietrich Samrowski, both of Munich, all of Fed. Rep. of Germany

[73] Assignee: Consortium für Elektrochemische Industrie GmbH, Munich, Fed. Rep. of Germany

[21] Appl. No.: 114,814

[22] Filed: Jan. 24, 1980

[30] Foreign Application Priority Data

Feb. 3, 1979 [DE] Fed. Rep. of Germany ....... 2904081

[51] Int. Cl.³ .................. C07F 7/08; C10M 1/24; C10M 1/44
[52] U.S. Cl. ............................. 252/41; 252/32.5; 556/401
[58] Field of Search ................ 556/401; 252/32.5, 41

[56] References Cited

U.S. PATENT DOCUMENTS

| Re. 28,938 | 8/1976 | Koda et al. ............... 556/401 |
| 2,739,952 | 3/1956 | Linville .................. 556/401 X |
| 3,047,497 | 7/1962 | Bluestein ................ 252/41 X |
| 4,070,343 | 1/1978 | Kishimoto et al. ........ 556/401 X |

*Primary Examiner*—Paul F. Shaver

[57] ABSTRACT

Stabilized organopolysiloxane oils having at least one aliphatic hydrocarbon radical with at least two carbon atoms and containing rubidium and/or cesium compounds which are at least partially soluble in the oil, in which the amount of rubidium and/or cesium present in the oil is from 0.01 to 3 percent by weight, based on the weight of the oil.

The stabilized organopolysiloxane oils are useful as lubricants or as additives for lubricating compositions.

8 Claims, No Drawings

STABILIZED ORGANOPOLYSILOXANE OILS

The present invention relates to stabilized organopolysiloxane oils and more particularly to stabilized organopolysiloxane oils which contain rubidium and/or cesium compounds.

BACKGROUND OF THE INVENTION

Organopolysiloxane oils having at least one aliphatic hydrocarbon radical or substituted hydrocarbon radical with at least two carbon atoms and containing alkali metal compounds, such as a lithium soap of a higher fatty acid are described in U.S. Pat. No. 3,537,997 to Wright.

In contrast to the organopolysiloxane oils known heretofore which have at least one aliphatic hydrocarbon radical or substituted aliphatic hydrocarbon radical with at least two carbon atoms and containing alkali metal compounds or conventional antioxidants, the organopolysiloxane oils of this invention are substantially more resistant to oxidation.

Therefore, it is an object of this invention to provide stabilized organopolysiloxane oils. Another object of this invention is to provide organopolysiloxane oils which are substantially more resistant to oxidation. Still another object of this invention is to provide organopolysiloxane oils having at least one aliphatic hydrocarbon radical of substituted aliphatic hydrocarbon radical with at least two carbon atoms which is substantially more resistant to oxidation. A further object of this invention is to provide stabilized organopolysiloxane oils which may be used as lubricants.

SUMMARY OF INVENTION

The foregoing objects and others which will become apparent from the following description are accomplished in accordance with this invention, generally speaking, by providing organopolysiloxane oils having at least one aliphatic hydrocarbon radical or substituted aliphatic hydrocarbon radical with at least two carbon atoms and containing an alkali metal compound which is partially soluble in the oil in an amount of from 0.01 to 3 percent by weight based on the weight of the organopolysiloxane oils and calculated as the alkali metal, in which the alkali metal is selected from the group consisting of rubidium, cesium and mixtures thereof.

DETAILED DESCRIPTION OF THE INVENTION

The aliphatic hydrocarbon radical and substituted aliphatic hydrocarbon radical of the organopolysiloxane oils having at least two carbon atoms preferably contains a maximum of 20 carbon atoms per group.

Examples of suitable aliphatic hydrocarbon radicals having at least two carbon atoms are the ethyl, n-propyl, isopropyl, n-butyl, sec-butyl, 4-methylpentyl, cyclohexyl, n-octyl, 2-ethylhexyl, 2,5,5-trimethylpentyl, and 1,3,5,7-tetramethyladamantyl radicals, as well as the heptyl, decyl and dodecyl radicals.

If the aliphatic hydrocarbon radicals having at least two carbon atoms are substituted, they may contain one or more substituents, which may be the same or different. Substituents which may be present on the aliphatic hydrocarbon radicals having at least two carbon atoms are, for example, aromatic hydrocarbon radicals which in turn may be further substituted, chlorine atoms, fluorine atoms, ester groups and ether groups. Specific examples of substituted aliphatic hydrocarbon radicals having at least two carbon atoms are the 2,2-dimethyl-3-phenylpropyl, 1,1,1-trifluoropropyl and 3-phenoxypropyl radicals, as well as radicals having the formulas n-$C_4H_9OOCCH_2CH(COO$-n-$C_4H_9)(CH_2)_3$-, n-$C_4H_9OOC(CH_2)_3$-, $CH_3O(CH_2)_2OOCCH_2CH[COO(CH_2)_2OCH_3](CH_2)_3$-, $(C_2H_5OOC)_2C(CH_3)(CH_2)_3$- and n-$C_4H_9OOC(CH_2)_{10}$-.

Preferably, all of the silicon valences of the organopolysiloxane oils which have at least one aliphatic hydrocarbon radical or substituted aliphatic hydrocarbon radical with at least two carbon atoms, are saturated by SiC bonds and siloxane oxygen atoms, or possibly by aryl or arylene radicals which are bonded through oxygen.

If SiC-bonded groups are present in the organopolysiloxane oils other than the aliphatic hydrocarbon radical or substituted aliphatic hydrocarbon radical having at least two carbon atoms, then such radicals are preferably methyl, phenyl, chlorophenyl and/or dichlorophenyl radicals.

The organopolysiloxane oils, which have at least one aliphatic hydrocarbon radical or substituted aliphatic hydrocarbon radical with at least two carbon atoms, preferably contain from two to 100 silicon atoms per molecule, and more preferably from three to 20 silicon atoms per molecule.

The organopolysiloxane oils, which have at least one aliphatic hydrocarbon radical or substituted aliphatic hydrocarbon radical having at least two carbon atoms, may be linear, branched, monocyclic or polycyclic.

Mixtures of different organopolysiloxane oils having at least one aliphatic hydrocarbon radical or substituted aliphatic hydrocarbon radical with at least two carbon atoms may be present.

Preferably, the organopolysiloxane oils having at least one aliphatic hydrocarbon radical or substituted aliphatic hydrocarbon radical with at least two carbon atoms, contain rubidium and/or cesium compounds which are at least partially soluble in the oils in an amount of from 0.05 to 0.5 percent by weight based on the weight of the oils and calculated as rubidium and/or cesium.

In preparing the stabilized organopolysiloxane oils of this invention, rubidium and/or cesium may be used in the form of compounds which are at least partially soluble in the organopolysiloxane oils. Examples of such partially soluble compounds are salts of rubidium and/or cesium of carboxylic acids having from 2 to 22 carbon atoms such as stearic acid, lauric acid, myristic acid, palmitic acid, salicylic acid, alkyl or allylbenzoic acid, sebacic acid and monoalkyl succinic acid esters, phenolates of rubidium and/or cesium, salts of rubidium and/or cesium with sulfonic acids, salts of rubidium and/or cesium with mono-and/or diesters of phosphoric acid, salts of rubidium and/or cesium with acidic phosphonic acid esters having from 6 to 30 carbon atoms, salts of rubidium and/or cesium with phosphoric acid esters, and salts of rubidium and/or cesium with thiophosphoric acid esters.

Also, in preparing the stabilized organopolysiloxane oils of this invention, the compounds of rubidium and/or cesium which are at least partially soluble in the oil may be prepared in situ, i.e., by reacting compounds of rubidium and/or cesium which are insoluble in the oil, such as cesium carbonate and/or rubidium carbonate, with organo-functional groups of the oil, particularly ester groups.

Mixtures of different compounds of rubidium and/or cesium may also be present in the organopolysiloxane oils of this invention.

In addition to the organopolysiloxane oils having at least one aliphatic hydrocarbon radical or substituted aliphatic hydrocarbon radical with at least 2 carbon atoms and containing a compound of rubidium and/or cesium, the organopolysiloxane oils of this invention may also contain other substances. Examples of such other substances are trimethylsiloxy-terminated diorganopolysiloxanes consisting of dimethylsiloxane units, methylphenylsiloxane units or methylchlorophenylsiloxane units or at least two of these types of diorganosiloxane units, salts of carboxylic acids having from 2 to 22 carbon atoms with metals other than rubidium and/or cesium, particularly with lithium, such as lithium stearate, lithium-12-hydroxystearate and lithium myristate, polytetrafluoroethylene, polyureas, phthalocyanines, clays, silicon dioxide having a specific surface area (BET) of at least 50 m$^2$/g, and antioxidants other than rubidium or cesium compounds.

The organopolysiloxane oils of this invention may be used as lubricants or as additives for lubricating compositions, including their use as thread lubricants for inorganic or organic fibers such as polyester yarns and as metal-machining oils. These organopolysiloxane oils may also be used as heat or power transfer fluids.

In the following examples, all percentages are by weight unless otherwise specified.

EXAMPLE 1

Cesium stearate is dissolved with heating in a trimethylsiloxy-terminated diorganopolysiloxane oil having an average of 9 units of the following formula:
n-C$_4$H$_9$OOCCH$_2$CH(COO-n-C$_4$H$_9$)(CH$_2$)$_3$CH$_3$SiO-,
in an amount such that 0.035 percent of cesium based on the weight of the oil is present in the diorganopolysiloxane oil.

EXAMPLE 2

The procedure described in Example 1 is repeated except that cesium salicylate is substituted for the cesium stearate, in which the amount of cesium present is 0.5 percent calculated as cesium and based on the weight of the oil.

EXAMPLE 3

The procedure described in Example 1 is repeated except that a cesium salt of 3,5-di(tert-butyl)-4-hydroxybenzylphosphonic acid monoethyl ester in an amount of 0.03 percent cesium, based on the weight of the oil is substituted for the cesium stearate.

EXAMPLE 4

The organopolysiloxane oil described in Example 1, containing twice its weight of n-butanol is mixed with sufficient cesium carbonate dissolved in a small amount of water so that 0.4 percent by weight of cesium is present in the oil, calculated as cesium and based on the weight of the oil and then the mixture is refluxed with stirring for five hours. The solvents are then distilled off, and at the end of the distillation, the pressure in the distillation flask is approximately 14 mbar and the temperature of the contents of this flask is 180° C. The distillation residue is filtered.

EXAMPLE 5

The procedure described in Example 4 is repeated except that cesium carbonate dissolved in a small amount of water, is present in the oil in an amount of 0.08 percent cesium, based on the weight of the oil.

EXAMPLE 6

The procedure described in Example 4 is repeated except that cesium carbonate dissolved in a small amount of water is present in the oil in an amount of 0.04 percent based on the weight of the oil.

EXAMPLE 7

The procedure described in Example 4 is repeated except that a solution containing a trimethysiloxy-terminated diorganopolysiloxane having an average of 9 units of the formula
n-C$_4$H$_9$OOC(CH$_2$)$_3$(CH$_3$)SiO-
and twice its weight of n-butanol is substituted for the organopolysiloxane oil of Example 1 in butanol.

EXAMPLE 8

The procedure described in Example 4 is repeated except that a solution containing a trimethylsiloxy-terminated diorganopolysiloxane having an average of 10 units of the formula
CH$_3$O(CH$_2$)$_2$OOCCH$_2$CH(COOCH$_2$CH$_2$OCH$_3$)(CH$_2$)$_3$CH$_3$SiO-
and twice its weight of n-butanol is substituted for the organopolysiloxane oil of Example 1 in butanol.

EXAMPLE 9

The procedure described in Example 4 is repeated except that a solution containing a trimethylsiloxy-terminated diorganopolysiloxane having an average of 8 units of the formula
n-C$_4$H$_9$OOC(CH$_2$)$_{10}$CH$_3$SiO-
and twice its weight of n-butanol is substituted for the organopolysiloxane oil of Example 1 in butanol. The ratio of cesium carbonate to oil is 3 mMoles/100 g of oil.

COMPARISON EXAMPLE (a)

The procedure described in Example 9 is repeated except that 3.4 mMoles of N(C$_2$H$_5$)$_4$OH dissolved in a small amount of water per 100 g of oil are substituted for the cesium carbonate. The oil contains about 0.44 percent of N(C$_2$H$_5$)$_4$, based on the weight of oil.

COMPARISON EXAMPLE (b)

The procedure described in Example 9 is repeated except that 2.9 mMoles of barium hydroxide dissolved in a small amount of water per 100 g of oil are substituted for the cesium carbonate. The oil contains about 0.4 percent barium, based on the weight of oil.

COMPARISON EXAMPLE (c)

The procedure described in Example 9 is repeated except that 2.9 mMoles of potassium carbonate dissolved in a small amount of water per 100 g of oil are substituted for the cesium carbonate. The amount of potassium present in the oil calculated as potassium, is 0.113 percent based on the weight of the oil.

COMPARISON EXAMPLE (d)

The procedure described in Example 9 is repeated except that 3.8 mMoles of sodium carbonate dissolved in a small amount of water per 100 g of oil are substituted for the cesium carbonate. The amount of sodium present in the oil, calculated as sodium, is 0.087 percent based on the weight of the oil.

COMPARISON EXAMPLE (e)

The procedure described in Example 9 is repeated except that 4.2 mMoles of lithium hydroxide dissolved in a small amount of water per 100 g of oil are substituted for the cesium carbonate. The amount of lithium present in the oil is 0.029 percent based on the weight of the oil.

EXAMPLE 10

The procedure described in Example 5 is repeated except that a solution containing a trimethysiloxy-terminated diorganopolysiloxane having an average of 4 units of the formula:
n-$C_4H_9OOC(CH_2)_{10}CH_3SiO$-
and an average of 2 units of the formula:
$(CH_3)_2CH(CH_2)_3CH_3SiO$-
and twice its weight of n-butanol is substituted for the organopolysiloxane oil of Example 1 in butanol.

EXAMPLE 11

The procedure described in Example 10 is repeated except that rubidium carbonate dissolved in a small amount of water is present in the oil in an amount of 0.74 percent calculated as rubidium and based on the weight of the oil.

EXAMPLE 12

A solution containing a trimethylsiloxy-terminated diorganopolysiloxane having an average of 56 dimethylsiloxane units and an average of 14 units of the formula:
n-$C_4H_9OOCCH_2CH(COO$-n-$C_4H_9)(CH_2)_3CH_3SiO$-
and twice its weight of n-butanol is mixed with cesium carbonate in an amount such that the solution contains 0.16 percent of cesium, based on the weight of the oil, and then refluxed for 5 hours with agitation. The solvents are then distilled off, and at the end of the distillation the pressure in the distillation flask is about 16 mbar and the temperature of the contents of the flask is about 180° C. The distillation residue is then filtered.

EXAMPLE 13

About 150 g of methanol are added dropwise with stirring at 30° C. over a period of 2 hours to a mixture containing 454 g of
$(CH_3)_3C$-$CH_2$-$CH(CH_3)$-$CH_2$-$Si(CH_3)Cl_2$
and some isomers, 38 g of $(CH_3)_3C$-$CH_2$-$CH(CH_3)$-$CH_2$-$SiCl_3$, 5 g of

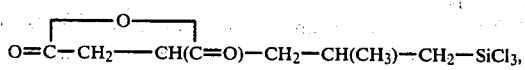

and 55 g of $(CH_3)_3SiCl$. About 50 g of water are added and then refluxed for 1 hour. An additional 25 g of water are added and the methanol is distilled off. The residue is diluted with ether and extracted about 15 times with water to remove hydrochloric acid. A solution containing 11 g of cesium carbonate in 250 ml of methanol is than added, and after refluxing for one hour, the solvent and low-boiling components are distilled off until a still temperature of 175° C. is achieved at a pressure of 0.2 mbar. After filtration, 360 g of oil are obtained having a cesium content of 0.12 percent.

A comparison example is carried out except that the 5 g of carboxylic acid anhydride-containing trichlorosilane is omitted. The treatment of the hydrolyzate with the solution of methanol and cesium carbonate is no longer necessary.

EXAMPLE 14

The procedure described in Example 4 is repeated except that a solution containing a trimethylsiloxy-terminated diorganopolysiloxane having an average of 10 dimethylsiloxane units and an average of 5 units of the formula
n-$C_4H_9OOCCH_2CH(COO$-n-$C_4H_9)(CH_2)_3Si(CH_3)O$-
and twice its weight of n-butanol is substituted for the organopolysiloxane oil of Example 1 in butanol.

COMPARISON EXAMPLE (f)

The organopolysiloxane oil described in Example 14 is mixed with 0.5 percent based on the weight of the oil of pentaerythrityltetrakis [3-(3,5-di-tert-butyl-4-hydroxyphenyl)propionate], 0.5 percent, based on the weight of the oil, of 3,3-thiobis(dodecyl propionate), and 0.5 percent, based on the weight of the oil, of 3,5-di(tert-butyl)-4-hydroxybenzylphosphonic acid monoethyl ester instead of a cesium compound.

EXAMPLE 15

The procedure described in Example 4 is repeated except that a solution containing a trimethylsiloxy-terminated diorganopolysiloxane having an average of about 9 units of the formula
$(C_2H_5OOC)_2C(CH_3)(CH_2)_3CH_3SiO$-
and twice its weight of ethanol is substituted for the organopolysiloxane oil of Example 1 in butanol.

COMPARISON EXAMPLE (g)

The organopolysiloxane oil described in Example 15 is mixed with the antioxidants of Comparison Example (f) in the same amounts as in Comparison Example (f) instead of with a cesium compound.

EXAMPLE 16

The procedure described in Example 4 is repeated except that rubidium carbonate dissolved in a small amount of water is substituted for the cesium carbonate. The amount of rubidium present in the organopolysiloxane oil is 0.75 percent based on the weight of the oil.

EXAMPLE 17

The procedure described in Example 4 is repeated except that rubidium carbonate dissolved in a small amount of water is substituted for the cesium carbonate. The amount of rubidium present in the organopolysiloxane oil is 1.5 percent based on the weight of the oil.

EXAMPLE 18

The precedure described in Example 4 is repeated except that a sufficient amount of cesium carbonate dissolved in a small amount of water is present in the oil to provide 1.6 percent by weight of cesium based on the weight of oil.

The resistance to oxidation of the products obtained from the examples as well as the untreated organopolysiloxane oils is determined by heating a 2 g sample of each of the products in a test tube having a diameter of 12 mm, which is exposed to air at the temperatures shown in the following table. The time required before gellation is observed is illustrated in the table.

TABLE

| Example No. | Untreated Oil Example No. | Number of Hours Before Gellation is Observed | |
|---|---|---|---|
| 1 | — | 2200 at 150° C. | |
| 2 | — | 2800 at 150° C. | |
| 3 | — | 3100 at 150° C. | |
| 4 | — | 3700 at 150° C. | |
| 5 | — | 2500 at 150° C. | |
| 6 | — | 2100 at 150° C. | |
| — | 1–6 and 16–18 | 900 at 150° C. | |
| 7 | — | 1600 at 160° C. | |
| — | 7 | 200 at 160° C. | |
| 8 | — | 900 at 150° C. | |
| — | 8 | Less than 40 at 150° C. | |
| 9 | — | 1400 at 150° C. | |
| — | 9 | 200 at 150° C. | |
| (a) | — | 100 at 150° C. | |
| (b) | — | 200 at 150° C. | |
| (c) | — | 1000 at 150° C. | |
| (d) | — | 900 at 150° C. | |
| (e) | — | 900 at 150° C. | |
| 10 | — | 400 at 150° C. | |
| 11 | — | 400 at 150° C. | |
| — | 10 and 11 | 90 at 150° C. | |
| 12 | — | Over 2000 at 150° C. | |
| — | 12 | 400 at 150° C. | |
| 13 | — | Over 4500 at 160° C. | |
| — | 13 | 245 at 160° C. | |
| 14 | — | 6500 at 150° C. and 3000 at 160° C. | |
| — | 14 | 1500 at 150° C. | |
| (f) | — | 6200 at 150° C. | |
| 15 | — | 1750 at 150° C., 2600 at 160° C. | and more than (additional) |
| — | 15 | Between 300 and 500 at 150° C. | |
| (g) | — | 2500 at 150° C. | |
| 16 | — | 3700 at 160° C. | |
| 17 | — | 3800 at 160° C. | |
| 18 | — | 3800 at 160° C. | |

The organopolysiloxane oil used in Examples 1 through 6 and 16 through 18 were prepared in the following manner:

About 3.3 kg of allyl succinic acid dibutyl ester are added over a period of 2 hours, with constant agitation, to a mixture containing 570 g of a polymethylhydrogensiloxane composition having the formula $(CH_3)_3Si[O-SiH(CH_3)]_9-OSi(CH_3)_3$, 0.4 liters of toluene and 100 mg of dipicolinoplatinum dichloride at 110° to 115° C. The temperature is then maintained at 130° to 135° C. for 18 hours. A test for the presence of Si-H groups is negative. The reactive mixture is then stirred for 1 hour with 10 g of bleaching clay (Tonsil L 80$^R$ from Süd-Chemie AG, Munich) and filtered. The toluene and unreacted allyl succinic acid ester along with other volatile by-products are then removed by distillation until a still temperature of 180° C. is obtained at a pressure of 0.2 mbar. About 2.5 kg of oil remains as a residue.

The oils employed in Examples 7 through 12, 14 and 15 are prepared in similar manner by reacting vinylacetic acid butyl ester, allyl succinic acid di-2-methoxyethyl ester, undecyl-10-acid butyl ester, and at times a mixture of 4-methylpentene-(1), allyl succinic acid dibutyl ester and allyl methylmalonic acid diethyl ester, with a corresponding amount of polymethylhydrogensiloxane.

What is claimed is:

1. Stabilized organopolysiloxane oils having at least one aliphatic hydrocarbon radical with at least 2 carbon atoms, and containing an alkali metal compound which is at least partially soluble in the oils in an amount of from 0.01 to 3 percent by weight based on the weight of the oils and calculated as the alkali metal in which the alkali metal is selected from the group consisting of rubidium, cesium and mixtures thereof.

2. The stabilized organopolysiloxane oils of claim 1, wherein the alkali metal is present in an amount of from 0.05 to 0.5 percent by weight, based on the weight of the oil and calculated as the alkali metal.

3. The stabilized organopolysiloxane oils of claims 1 or 2, wherein the alkali metal is a salt of carboxylic acids.

4. The stabilized organopolysiloxane oils of claims 1 or 2, wherein the alkali metal compound is a salt of acidic phosphonic acid esters having from 6 to 30 carbon atoms.

5. The stabilized organopolysiloxane oils of claim 1, wherein the alkali metal compound is a rubidium salt of carboxylic acids.

6. The stabilized organopolysiloxane oils of claim 1, wherein the alkali metal compound is a cesium salt of carboxylic acids.

7. Lubricants containing the organopolysiloxane oils of claim 1.

8. Lubricants containing the organopolysiloxane oils of claim 2.

* * * * *